(12) United States Patent
Hansen et al.

(10) Patent No.: US 11,924,337 B2
(45) Date of Patent: Mar. 5, 2024

(54) SENSITIVE DATA MANAGEMENT SYSTEM

(71) Applicant: Soliton Systems K.K., Tokyo (JP)

(72) Inventors: Bo Stig Hansen, Hilleroed (DK); Emil Mourier, Copenhagen (DK); Kiril Georgiev Georgiev, Noerrebro (DK); Thomas Hermann Wang-Nielsen, Frederiksberg (DK); Yuxiao Wang, Bagsvaerd (DK)

(73) Assignee: Soliton Systems K.K., Tokyo (JP)

( * ) Notice: Subject to any disclaimer, the term of this patent is extended or adjusted under 35 U.S.C. 154(b) by 482 days.

(21) Appl. No.: 17/266,070

(22) PCT Filed: Sep. 30, 2020

(86) PCT No.: PCT/JP2020/037347
§ 371 (c)(1),
(2) Date: Feb. 4, 2021

(87) PCT Pub. No.: WO2021/181736
PCT Pub. Date: Sep. 16, 2021

(65) Prior Publication Data
US 2022/0311605 A1   Sep. 29, 2022

Related U.S. Application Data

(60) Provisional application No. 62/989,473, filed on Mar. 13, 2020.

(51) Int. Cl.
*H04L 9/08* (2006.01)
*G06F 21/60* (2013.01)
(Continued)

(52) U.S. Cl.
CPC .......... *H04L 9/0866* (2013.01); *G06F 21/602* (2013.01); *H04L 9/14* (2013.01); *H04L 9/30* (2013.01)

(58) Field of Classification Search
CPC . H04L 9/0866; H04L 9/14; H04L 9/30; H04L 9/0643; G06F 21/602; G06F 21/6245
See application file for complete search history.

(56) References Cited

U.S. PATENT DOCUMENTS

| 2009/0080662 A1* | 3/2009 | Thibadeau | G06F 21/31 |
| | | | 380/286 |
| 2019/0229908 A1* | 7/2019 | Peddada | G06F 21/602 |

(Continued)

FOREIGN PATENT DOCUMENTS

| JP | 2005-318299 A | 11/2005 |
| JP | 2007-013484 A | 1/2007 |

(Continued)

OTHER PUBLICATIONS

PCT/JP2020/037347 International Search Report and Written Opinion dated Mar. 2, 2021, English Translation.

*Primary Examiner* — Abiy Getachew
(74) *Attorney, Agent, or Firm* — Alston & Bird LLP

(57) ABSTRACT

An aspect of the present invention is provided with a sensitive data protection code generating unit which generates a sensitive data protection code of a predetermined data length, a symmetric encryption key generating unit which generates a symmetric encryption key by using a key derivation function that takes, as input, the sensitive data protection code, a sensitive data encrypting unit which encrypts sensitive data by using the symmetric encryption key, a sensitive data protection code encrypting unit which encrypts the sensitive data protection code by using a public key provided from an sensitive data access support terminal, and a deleting unit which deletes the symmetric encryption key and the sensitive data after the encryption of the sensitive data, and deletes the sensitive data protection code after the encryption of the sensitive data protection code.

19 Claims, 14 Drawing Sheets

B SENSITIVE DATA ACCESS SUPPORT TERMINAL (TERMINAL B)

A SENSITIVE DATA MANAGEMENT APPARATUS (APPARATUS A)

(51) Int. Cl.
*H04L 9/14* (2006.01)
*H04L 9/30* (2006.01)

(56) References Cited

U.S. PATENT DOCUMENTS

2020/0257452 A1\* 8/2020 Oh .................... G06F 3/0647
2020/0259647 A1\* 8/2020 Goncalves ............ H04L 9/14

FOREIGN PATENT DOCUMENTS

JP      2015-022460 A    2/2015
WO    WO 2021/181736 A1  9/2021

\* cited by examiner

SENSITIVE DATA MANAGEMENT SYSTEM

CROSS-REFERENCE TO RELATED APPLICATIONS

This application is a national stage entry of International Application No. PCT/JP2020/037347, titled "SENSITIVE DATA MANAGEMENT APPARATUS, PROGRAM, AND RECORDING," filed Sep. 30, 2020, which claims priority to U.S. Provisional Application No. 62/989,473, titled "SENSITIVE DATA MANAGEMENT SYSTEM," filed Mar. 13, 2020, the contents of both of which are hereby incorporated herein by reference in their entirety.

TECHNICAL FIELD

The present invention relates to a sensitive data management apparatus, a program, and a recording medium.

BACKGROUND ART

There is heretofore disclosed a technology regarding a system that encrypts files by using encryption technologies of both symmetric encryption key encryption and public key encryption (see PTL 1). In this system, a file is encrypted using a symmetric encryption key, and the symmetric encryption key is encrypted by a public key of a user or administrator. The encrypted symmetric encryption key is saved, together with the encrypted file.

The system receives from a user a request to read the file, and in a case where a proper secret key has been used, decrypts the encrypted symmetric encryption key, decrypts the encrypted file by using the obtained symmetric encryption key, and returns the file to the user.

There is also disclosed a technology in which both a user-side data processing apparatus that saves encrypted data in a storage medium, and a recovery processing apparatus that performs recovery work in an emergency in which the encrypted data cannot be decrypted, share work and collaborate to recover data (see PTL 2).

The recovery processing apparatus creates a pair of a public key and a private key, and hands only the public key to the user-side apparatus. The user-side apparatus creates an encryption key for encrypting data, encrypts this encryption key with the public key, and writes the encrypted encryption key to a predetermined location in the storage medium. In a case of an emergency, the user-side apparatus retrieves the encrypted encryption key from the storage medium, and hands the encrypted encryption key to the recovery processing apparatus. The recovery processing apparatus decrypts the encrypted encryption key by using the private key, and sends back the decrypted encryption key to the user-side apparatus. As a result, the user-side apparatus can recover the data.

There is also disclosed a technology in which a content protection key for protecting content stored in a first device is encrypted by a public key of a private-key/public-key pair managed by a second device, whereby only a user who can be authenticated by the second device can use this private key to decrypt the encrypted content protection key, and decrypt and use the content stored in the first device by using the obtained content protection key (see PTL 3).

There is also disclosed a technology in which bidirectional communication of messages encrypted using a master key is performed between first and second systems (see PTL 4).

The first system generates a pair of a first public key and a first secret key, and a pair of a second public key and a second secret key. The second system generates a pair of a third public key and a third secret key, and a pair of a fourth public key and a fourth secret key. Note, however, that the second and fourth public keys are generated on the basis of secret information shared between the first and second systems.

The first and second systems exchange their own two public keys with each other. The first system generates a master key on the basis of the first and second secret keys, and the third and fourth public keys. The second system generates a master key on the basis of the first and second public keys, and the third and fourth secret keys. The master keys each of which is generated at the first and second systems are identical to each other. Accordingly, the first and second systems share the master key through exchange of the public keys, and exchange messages by using this shared key.

CITATION LIST

Patent Literature

[PTL 1] U.S. Pat. No. 6,249,866
[PTL 2] Japanese Patent Application Publication No. 2007-13484
[PTL 3] U.S. Patent Application Publication No. 2007/0300080 Specification
[PTL 4] Japanese Patent No. 4701238

SUMMARY OF INVENTION

Technical Problem

The present invention has been proposed to solve problems of the conventional technology.

Solution to Problem

A sensitive data management apparatus that is a first aspect of the present invention includes a sensitive data protection code generating unit which generates a sensitive data protection code of a predetermined data length, a symmetric encryption key generating unit which generates a symmetric encryption key by using a key derivation function that takes, as input, the sensitive data protection code, a sensitive data encrypting unit which encrypts sensitive data by using the symmetric encryption key, a sensitive data protection code encrypting unit which encrypts the sensitive data protection code by using a public key provided from an sensitive data access support terminal, and a deleting unit which deletes the symmetric encryption key and the sensitive data after the encryption of the sensitive data, and deletes the sensitive data protection code after the encryption of the sensitive data protection code.

A sensitive data management apparatus that is a second aspect of the present invention includes a sensitive data protection code generating unit which generates a sensitive data protection code of a predetermined data length, a first symmetric encryption key generating unit which generates a first symmetric encryption key by using a key derivation function that takes, as input, the sensitive data protection code, a sensitive data encrypting unit which encrypts sensitive data by using the first symmetric encryption key, a second symmetric encryption key generating unit which generates a second symmetric encryption key by using predetermined information exchanged in advance with a sensitive data access support terminal, a sensitive data protection code encrypting unit which encrypts the sensitive data protection code by using the second symmetric encryption key, and a deleting unit which deletes the first symmetric encryption key and the sensitive data after the encryption of the sensitive data, and deletes the second symmetric encryption key and the sensitive data protection code after the encryption of the sensitive data protection code.

A program that is a third aspect of the present invention is a program that causes a computer to function as each unit of the sensitive data management apparatus.

A recording medium that is a fourth aspect of the present invention is a recording medium in which the program is recorded.

Advantageous Effects of Invention

The present invention can improve safety of sensitive data.

DESCRIPTION OF EMBODIMENTS

Embodiments of the present invention will be described in detail below with reference to the accompanying Figures. A plurality of, but not all, embodiments are shown here. Embodiments of the present invention may be embodied in many other different forms. That is to say, embodiments of the present invention should not be construed as limited to the embodiments set forth in the Specification. These embodiments are provided to satisfy requirements regarding the Specification. Note that like numbers refer to like elements and steps throughout the Figures. The embodiments of the present invention are applicable to the following cases, for example, but are also applicable to other cases.

A first case is a case of, at a time of login to a PC (i.e., a computing device), temporarily enabling use of sensitive data (e.g., a password of the PC, modified data where the password of the PC is encrypted, or the like). Accordingly, password-free login processing using a smartphone, for example, can be realized.

A second case is a case of temporarily enabling use of a master password for managing a password database in which a plurality of passwords is saved. Note that the master password is used in cases of decrypting the entirely encrypted password database, cases of decrypting individual encrypted passwords read out from the password database, and so forth.

A third case is a case of an entry/exit control system that temporarily permits entering into and exiting from a secret chamber using a smartphone. A fourth case is a case of an engine key where a smartphone is used to temporarily (while on board) enable operations of an automobile.

First Embodiment

Figure 1:
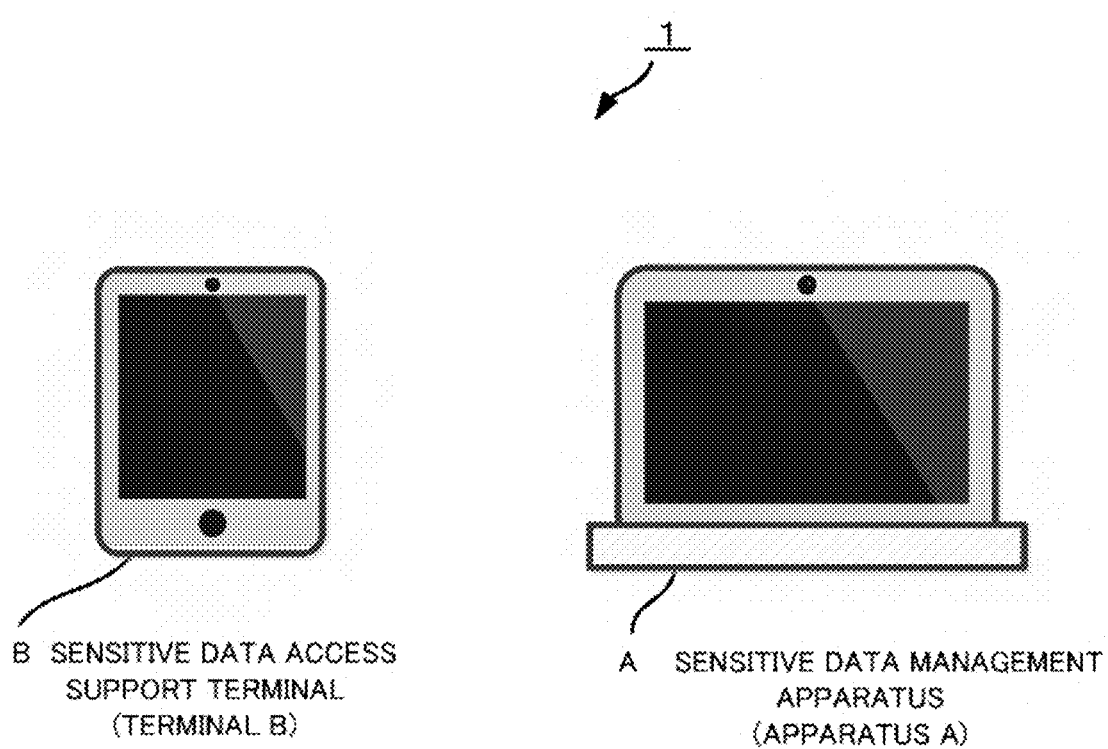
FIG. 1 is a schematic diagram illustrating a sensitive data management system that is an example of a first embodiment.

FIG. 1 is a schematic diagram illustrating a sensitive data management system 1 that is an example of a first embodiment. The sensitive data management system 1 is provided with a sensitive data access support terminal B and a sensitive data management apparatus A. Computers, for example, are used as the sensitive data access support terminal B and the sensitive data management apparatus A.

Figure 2:
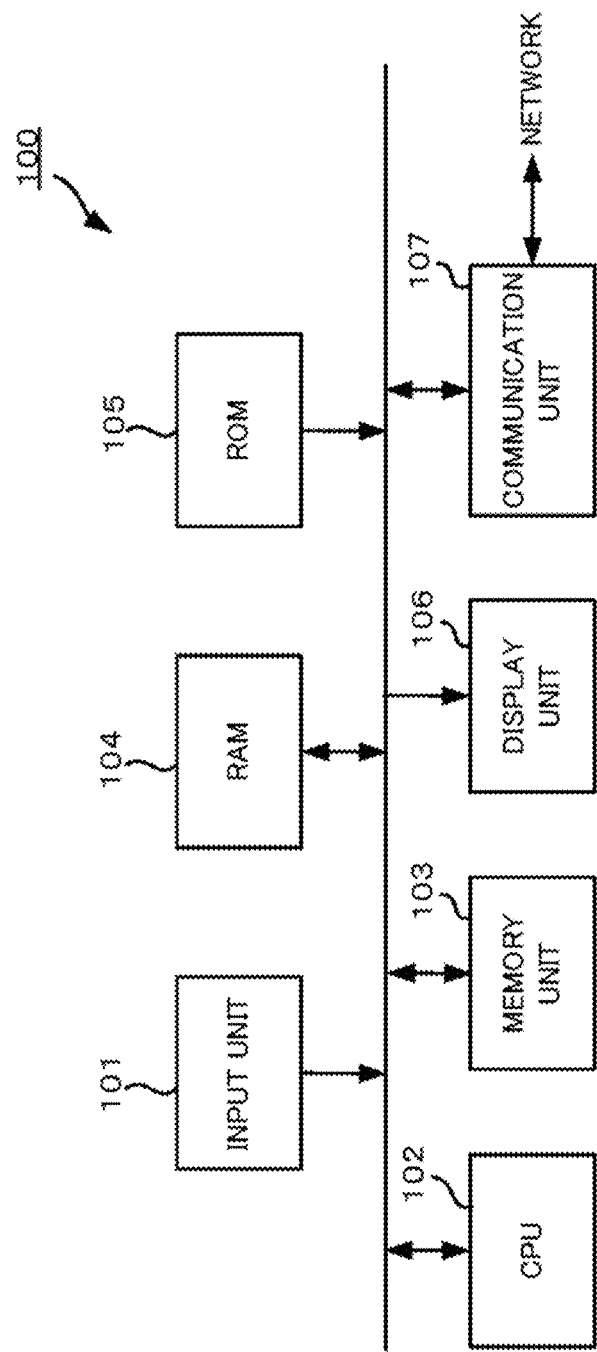
FIG. 2 is a block diagram illustrating an example of a computer used as a sensitive data access support terminal and a sensitive data management apparatus.

FIG. 2 is a block diagram illustrating an example of a computer 100 used as the sensitive data access support terminal B and the sensitive data management apparatus A in the present embodiment.

The computer 100 has, for example, an input unit 101 where user operation information and other information is input, a CPU 102 that performs encryption processing and so forth, a memory unit 103 where data is stored/read, RAM 104 that is a data working area, ROM 105 storing control programs of the CPU 102 and so forth, a display unit 106 that displays a user interface and processing results of the CPU 102 and so forth, and a communication unit 107 that performs data communication with external devices via a network.

The communication unit 107 is capable of data communication using wired, wireless, P2P, and other known network communication technology. Note that functions provided by the communication unit 107 may also be embodied by using a display that displays two-dimensional barcode images (image data) and a camera that photographs the two-dimensional barcode images, which will be described later. Further, the communication unit 107 may also be embodied by using a display that displays text and a keyboard with which a user directly inputs after recognizing the text.

The computer 100 is not limited to the form shown in FIG. 2, and may be a form including hardware, software, or both. The input unit 101 may be a keyboard for inputting the aforementioned text data, a camera for inputting the aforementioned image data, an operating panel, and so forth.

Also, the computer 100 is provided with the input unit 101 and the display unit 106 that are independent from each other in FIG. 2, but instead may be provided with a touch panel where the functions of the input unit 101 and the display unit 106 are integrated.

The computer 100 may also be any of a desktop, a laptop (notebook), or a tablet, or may be a so-called smartphone. That is to say, the computer 100 is applicable in any form, as long as it is capable of executing the steps of the flowcharts later-described in FIG. 3, FIG. 4 and so forth.

The sensitive data access support terminal B is a computer 100 that is portable and of a size that is easy to carry, for example, and preferably is a so-called smartphone, for example. The sensitive data management apparatus A is a computer 100 that handles sensitive data and other various types of data.

[Encryption Processing (Encryption of Sensitive Data SD)]

Next, initial encryption processing of sensitive data SD saved in the sensitive data management apparatus A will be described. At a time of the encryption processing, transmission/reception of data between the sensitive data access support terminal B and the sensitive data management apparatus A is performed.

A form of the transmission/reception of data is not limited in particular, as long as data is output from one computer 100 and this data is input to the other computer 100. Examples of forms of the transmission/reception of data include the following cases (1) through (3).

(1) a case where a two-dimensional barcode image or text image is displayed on the display unit 106 of one computer 100, the input unit 101 (e.g., camera) of the other computer 100 photographs the image, and the CPU 102 performs decoding of the barcode image or recognition of text on the text image.

(2) a case where the communication unit 107 of one computer 100 transmits data via network (wired or wireless), and the communication unit 107 of the other computer 100 receives this data (3) a case where a text image is displayed on the display unit 106 of one computer 100, a user then recognizes the text rendered as this image and operates the input unit 101 (e.g., keyboard) of the other computer 100, thereby inputting this text data at the input unit 101 of the other computer 100

Figure 3:
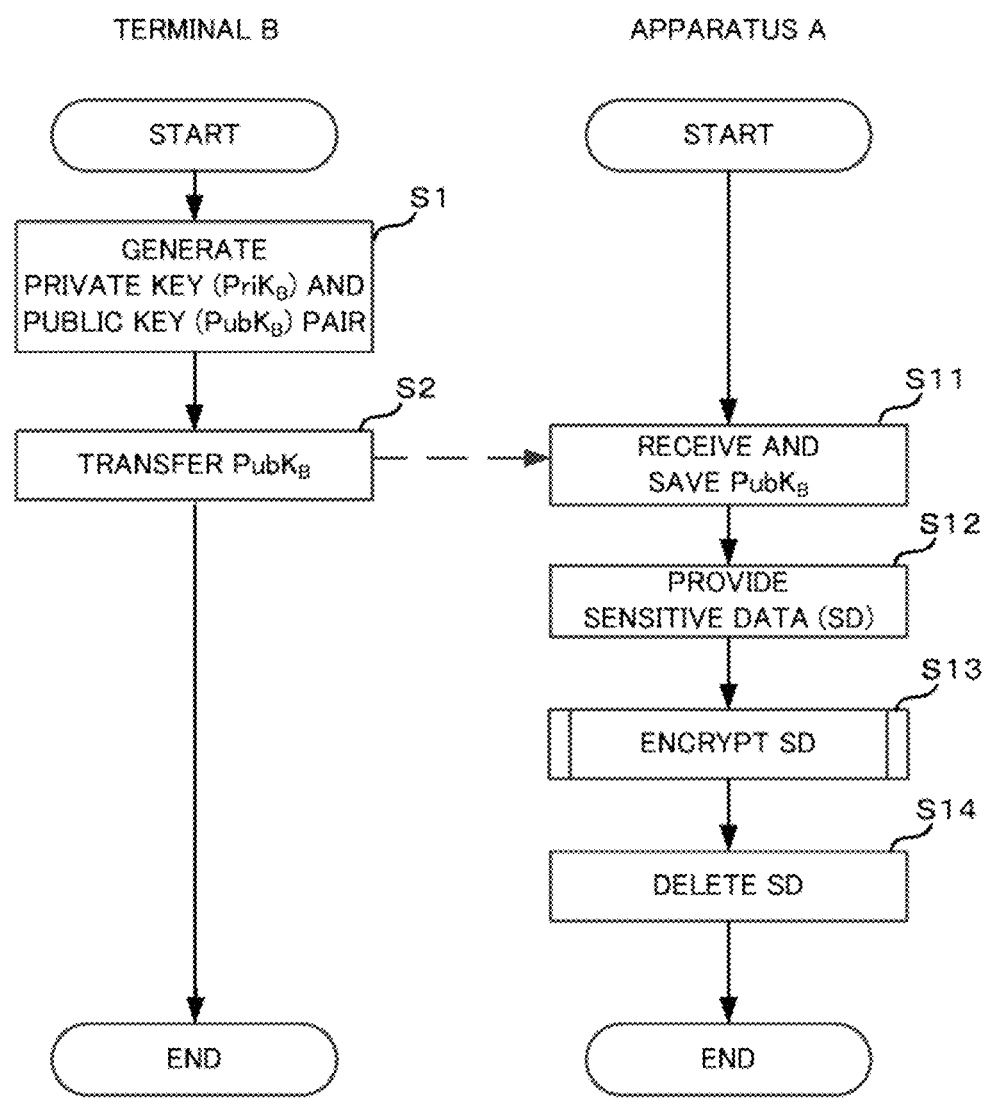
FIG. 3 is a flowchart illustrating an initial encryption routine for sensitive data according to the first embodiment.

FIG. 3 is a flowchart illustrating an initial encryption routine for sensitive data SD according to the first embodiment. The initial encryption routine is executed after an initial encryption starting operation which is performed either at the sensitive data management apparatus A or at the sensitive data access support terminal B.

Note that hereinafter, the term "encryption key", or simply "key", refers to a piece of digital information that determines the functional output of a cryptographic algorithm. That is to say, an encryption key or a key determines a transformation method of plaintext into ciphertext, or vice versa.

In step S1, the sensitive data access support terminal B generates a private key $PriK_B$, and a public key $PubK_B$ corresponding thereto.

In step S2, the sensitive data access support terminal B transmits the public key $PubK_B$ to the sensitive data management apparatus A.

In step S11, the sensitive data management apparatus A receives and saves the public key $PubK_B$ transmitted from the sensitive data access support terminal B.

In step S12, the sensitive data management apparatus A prepares sensitive data SD, such as a password or the like, for example. Note that the sensitive data SD may be transmitted from an external device, or may be saved in the sensitive data management apparatus A in advance.

In step S13, the sensitive data management apparatus A encrypts the sensitive data SD. Note that step S13 will be described in detail later.

In step S14, the sensitive data management apparatus A deletes the sensitive data SD. Accordingly, the sensitive data SD itself does not exist on the sensitive data management apparatus A, and only the encrypted sensitive data SD is stored.

Figure 4:
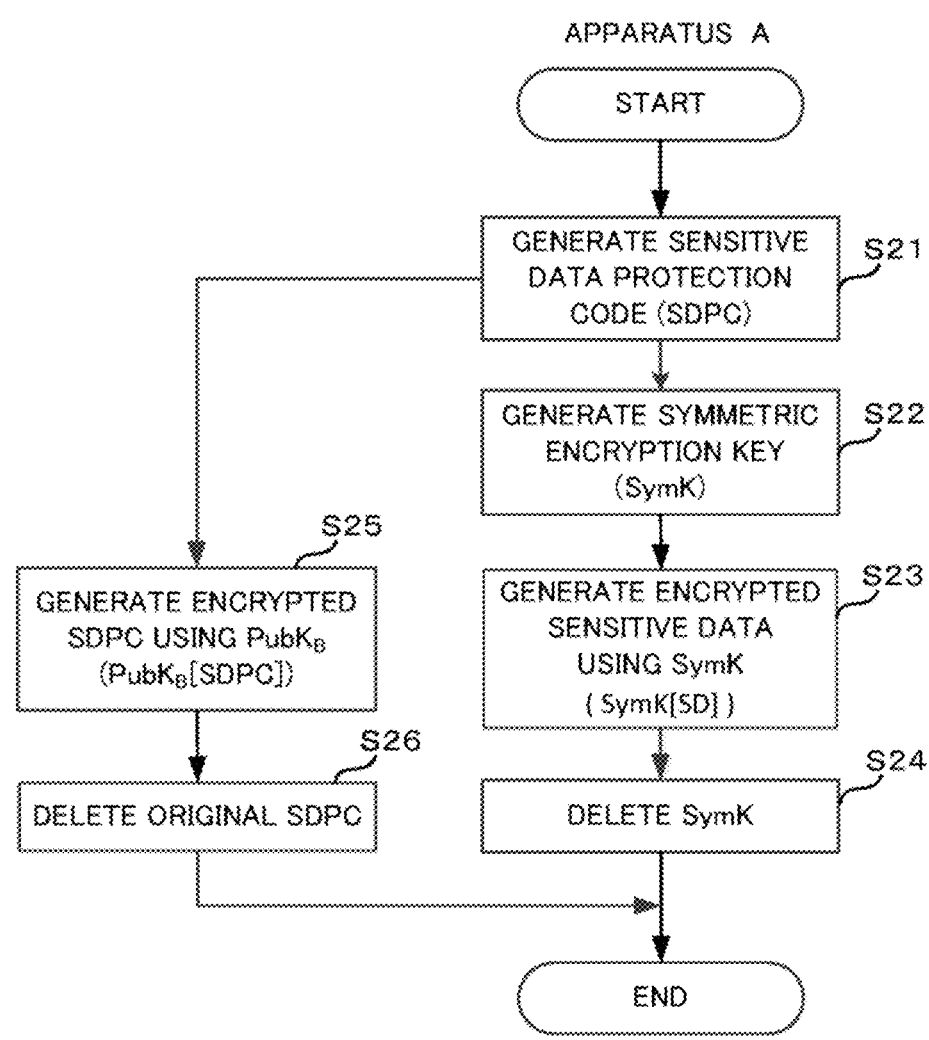
FIG. 4 is a flowchart illustrating an encryption subroutine for sensitive data, which is detailed processing of step S13, according to the first embodiment.

FIG. 4 is a flowchart illustrating an encryption subroutine for the sensitive data SD, which is detailed processing of step S13 in FIG. 3.

In step S21, the sensitive data management apparatus A generates a sensitive data protection code SDPC. Note that the sensitive data protection code SDPC is secret data that is randomly generated, and that is configured as a text string that is sufficiently short to be input by a user typing. The sensitive data protection code SDPC is preferred to be a text string of 256 bytes or shorter, for example. Note that a 16-byte text string is most preferable for the sensitive data protection code SDPC, but there are cases of being shorter than this, such as a 4-byte text string, in accordance with a custom of PINs for the cash cards, for example.

In step S22, the sensitive data management apparatus A generates a symmetric encryption key SymK using a predefined key derivation function that uses the sensitive data protection code SDPC as input. The key derivation function here is a function that derives an encryption key of a long data length, using a pseudorandom number function such as a cryptographic hash function or the like, with a secret value of a short data length as the input thereof. The length of the symmetric encryption key SymK is a length of a degree where safety of the encrypted sensitive data SD is sufficiently guaranteed, e.g., 256 bits.

In step S23, the sensitive data management apparatus A encrypts the sensitive data SD using the symmetric encryption key SymK, thereby generating encrypted sensitive data SymK[SD]. The encrypted sensitive data SymK[SD] is saved in the sensitive data management apparatus A.

In step S24, the sensitive data management apparatus A deletes the symmetric encryption key SymK.

In step S25, the sensitive data management apparatus A uses the public key $PubK_B$ received from the sensitive data access support terminal B to encrypt the sensitive data protection code SDPC generated in step S21, thereby generating an encrypted sensitive data protection code $PubK_B$[SDPC]. Note that the public key $PubK_B$ is not limited to one directly received from the sensitive data access support terminal B, and may be one that the sensitive data management apparatus A has obtained as a result of searching a public key database to which the sensitive data access support terminal B has registered the public key $PubK_B$.

Note that elliptic curve cryptography (Elliptic Curve Integrated Encryption Scheme: ECIES), which is a type of a public key cryptosystem, can yield an encryption strength of around the same level as the well-known RSA cryptosystem, with a shorter key length. Generally, a key length of 224 bits or more is recommended for the elliptic curve cryptography. Accordingly, the elliptic curve cryptography that uses a 224-bit key (hereinafter referred to as ECIES 224) is adopted in the present embodiment.

Assuming that a data length of the sensitive data protection code SDPC is 16 bytes here, a data length of the encrypted sensitive data protection code $PubK_B$[SDPC] will be 1008 bits (126 bytes) in a case of using the elliptic curve cryptography, which corresponds to 168 characters when encoded using the Base64. On the other hand, in a case of using the RSA2048 that is the RSA cryptosystem having an encryption strength of around the same degree, a data length of the encrypted sensitive data protection code $PubK_B$[SDPC] is 2048 bits, which is a length approximately double as compared with the data length in a case of using the elliptic curve cryptography.

In step S26, the sensitive data management apparatus A deletes the sensitive data protection code SDPC generated in step S21.

Figure 5:
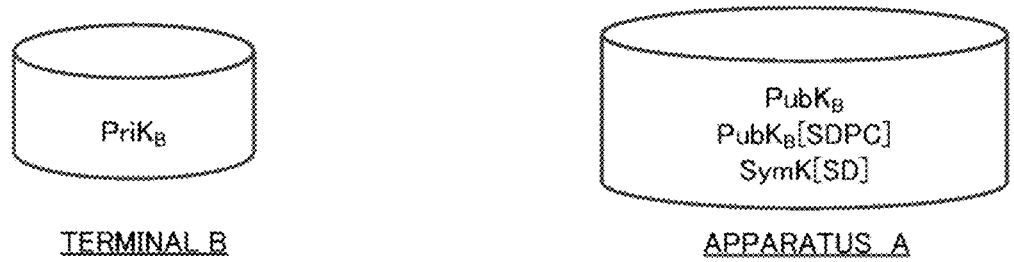
FIG. 5 is a conceptual diagram illustrating data saved in each of the sensitive data access support terminal and the sensitive data management apparatus, after the encryption of sensitive data, according to the first embodiment.

FIG. 5 is a conceptual diagram illustrating data saved in each of the sensitive data access support terminal B and the sensitive data management apparatus A after the encryption of the sensitive data SD shown in FIG. 3 and FIG. 4.

After the encryption of the sensitive data SD, the private key $PriK_B$ is saved in the sensitive data access support terminal B. Meanwhile, the public key $PubK_B$, the encrypted sensitive data protection code $PubK_B$[SDPC], and the encrypted sensitive data SymK[SD] are saved in the sensitive data management apparatus A.

That is to say, the sensitive data protection code SDPC is not saved as it is in the sensitive data management apparatus A. Accordingly, a third party cannot access the sensitive data SD without performing legitimate decryption processing.

[Decryption Processing (Decryption and Usage of Sensitive Data SD)]

Next, decryption processing of the encrypted sensitive data SD will be described. Transmission/reception of data between the sensitive data access support terminal B and the sensitive data management apparatus A is performed at a time of the decryption processing as well.

The sensitive data management apparatus A first transmits the encrypted sensitive data protection code $PubK_B$[SDPC] to the sensitive data access support terminal B, and thereafter re-generates the symmetric encryption key SymK using the sensitive data protection code SDPC returned from the sensitive data access support terminal B. The sensitive data management apparatus A decrypts the encrypted sensitive data SymK[SD] using this symmetric encryption key SymK, thereby obtaining the sensitive data SD itself. Specifically, the following processing is performed at the sensitive data access support terminal B and the sensitive data management apparatus A.

Figure 6:
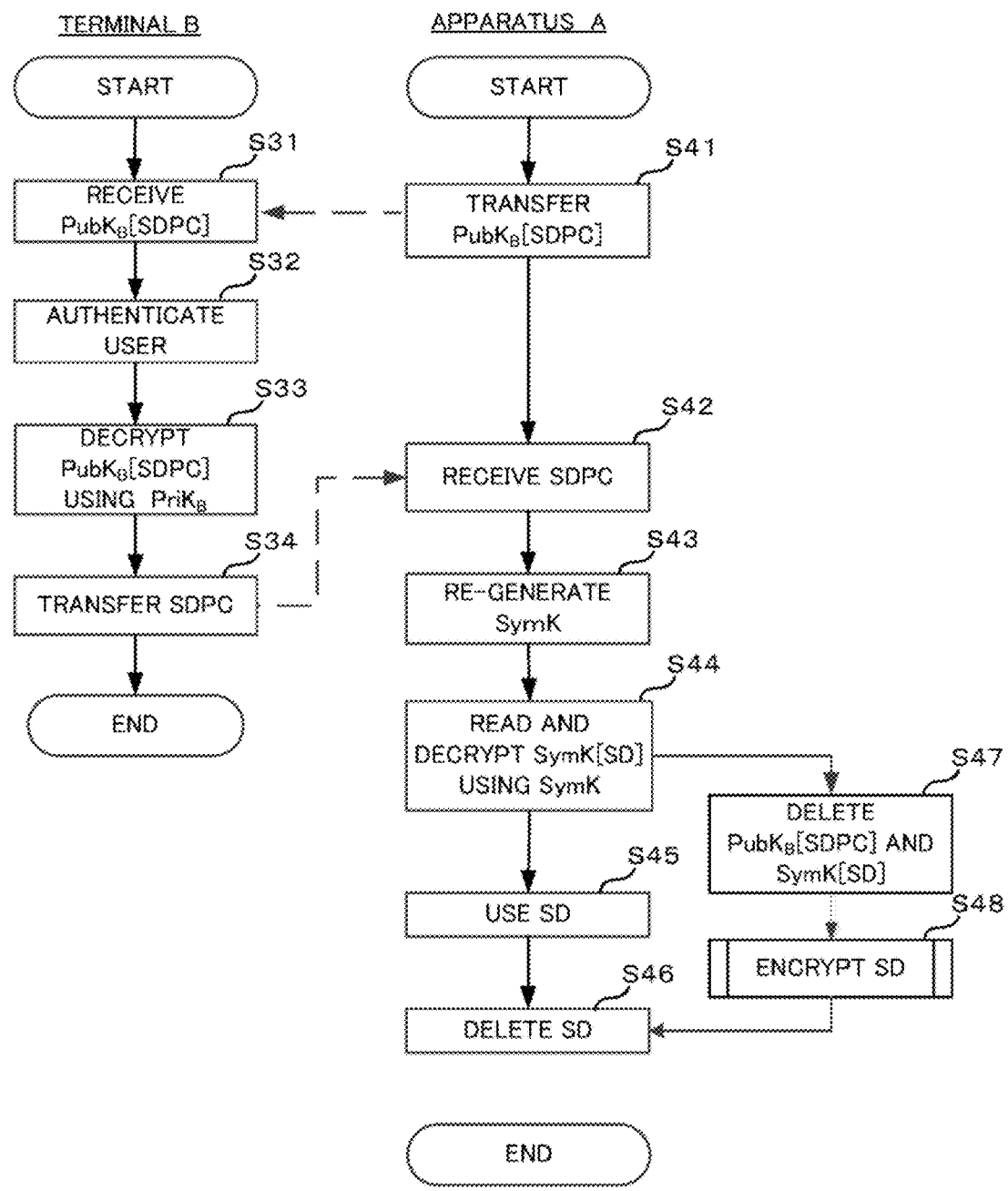
FIG. 6 is a flowchart illustrating a decryption routine for sensitive data according to the first embodiment.

FIG. 6 is a flowchart illustrating a decryption routine for the sensitive data SD according to the first embodiment. After an operation to start decryption is performed at the sensitive data management apparatus A or the sensitive data access support terminal B, the decryption routine is executed.

In step S31, the sensitive data access support terminal B receives the encrypted sensitive data protection code $PubK_B$[SDPC] transmitted from the sensitive data management apparatus A. The encrypted sensitive data protection code $PubK_B$[SDPC] is transmitted from the sensitive data management apparatus A in a later-described step S41.

In step S32, the sensitive data access support terminal B performs authentication of a user. After succeeding in performing authentication, the user can freely operate the sensitive data access support terminal B, not only in the first embodiment but in other embodiments as well.

In step S33, the sensitive data access support terminal B uses the private key $PriK_B$ saved therein to decrypt the encrypted sensitive data protection code $PubK_B$[SDPC] transmitted from the sensitive data management apparatus A, thereby obtaining the sensitive data protection code SDPC itself.

In step S34, the sensitive data access support terminal B transmits the sensitive data protection code SDPC obtained in step S33 to the sensitive data management apparatus A.

In step S41, on the other hand, the sensitive data management apparatus A reads out the encrypted sensitive data protection code $PubK_B$[SDPC] saved therein, and transmits the encrypted sensitive data protection code $PubK_B$[SDPC] to the sensitive data access support terminal B. Thereafter, the sensitive data access support terminal B executes the processing of the above-described steps S31 through S34, and transmits the sensitive data protection code SDPC itself to the sensitive data management apparatus A.

In step S42, the sensitive data management apparatus A receives the sensitive data protection code SDPC from the sensitive data access support terminal B.

In step S43, the sensitive data management apparatus A re-generates the symmetric encryption key SymK using the key derivation function used in step S22 in FIG. 4, with the sensitive data protection code SDPC received in step S42 as input.

In step S44, the sensitive data management apparatus A reads out the encrypted sensitive data SymK[SD] saved internally, and performs decryption processing using the symmetric encryption key SymK re-generated in step S43, thereby obtaining the sensitive data SD itself. Accordingly, the sensitive data SD prepared in step S12 of FIG. 3 is completely restored.

In step S45 and step S46, the sensitive data management apparatus A uses the sensitive data SD, and after confirming that processing of the later-described step S47 and step S48 has been completed, deletes this sensitive data SD.

In step S47, the sensitive data management apparatus A deletes the encrypted sensitive data protection code $PubK_B$[SDPC] and the encrypted sensitive data SymK[SD].

In step S48, the sensitive data management apparatus A executes the subroutine in FIG. 4 to encrypt the sensitive data SD again.

As described above, in the present embodiment, the following processes (1) through (3) are necessary to restore encrypted sensitive data SD.

Process 1: restoration of the sensitive data protection code SDPC

Process 2: re-generation of the symmetric encryption key SymK using the sensitive data protection code SDPC Process 3: decryption processing using the re-generated symmetric encryption key SymK (restoration of sensitive data SD)

Although the sensitive data management apparatus A can encrypt the sensitive data protection code SDPC using the public key $PubK_B$ provided from the sensitive data access support terminal B, the sensitive data management apparatus A cannot restore it. That is to say, the sensitive data management apparatus A cannot execute Process 1 just with the data saved in itself (FIG. 5), and as a result, cannot restore the sensitive data SD. Also, even if all data within the sensitive data management apparatus A is externally leaked, the sensitive data SD cannot be restored with the leaked data alone, and accordingly the safety of the sensitive data SD is guaranteed.

Accordingly, the sensitive data management apparatus A causes the sensitive data access support terminal B to carry out Process 1 and receives the sensitive data protection code SDPC from the sensitive data access support terminal B, and only after that, the sensitive data management apparatus is able to restore the sensitive data SD by carrying out Processes 2 and 3. As a result, a risk of the sensitive data SD being leaked externally can be suppressed as compared with a case in which a single computer 100 performs all of Processes 1 through 3.

Although an arrangement has been described so far where the sensitive data management apparatus A uses only one sensitive data access support terminal B to encrypt the sensitive data SD, this embodiment is not limited to the arrangement. For example, the sensitive data management apparatus A may encrypt the sensitive data SD using a plurality of sensitive data access support terminals B.

In this case, the sensitive data management apparatus A generates duplicates of the sensitive data SD in advance, and prepares a count of the sensitive data SD that is the same as the number of the sensitive data access support terminals B. The sensitive data management apparatus A then carries out the routines in FIG. 3 and FIG. 4 for each of the sensitive data access support terminals B next, and encrypts each sensitive data SD. As a result, the following data is obtained.

Figure 7:
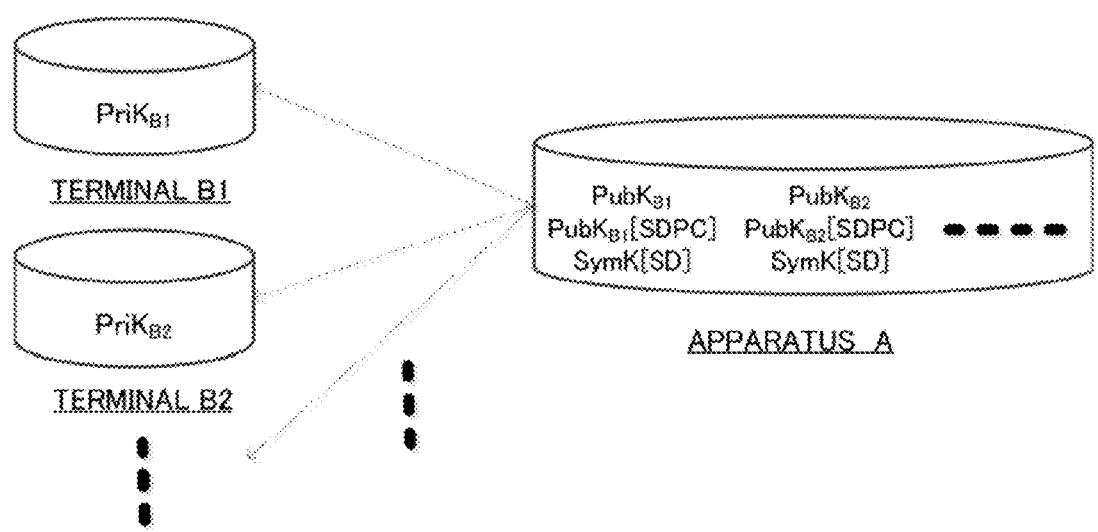
FIG. 7 is a conceptual diagram illustrating data saved in each of a plurality of sensitive data access support terminals and the sensitive data management apparatus.

FIG. 7 is a conceptual diagram illustrating data saved in each of the plurality of sensitive data access support terminals B1, B2, and so on, and in the sensitive data management apparatus A, in a case where each sensitive data SD is encrypted by the plurality of sensitive data access support terminals B1, B2, and so on.

The plurality of sensitive data access support terminals B1, B2, and so on respectively generate unique private keys $PriK_{B1}$, $PriK_{B2}$, and so on, and public keys $PubK_{B1}$, $PubK_{B2}$, and so on respectively corresponding thereto. The public keys $PubK_{B1}$, $PubK_{B2}$, and so on are then transmitted to the sensitive data management apparatus A.

The sensitive data management apparatus A uses the public keys $PubK_{B1}$, $PubK_{B2}$, and so on, that are received, to generate respectively corresponding encrypted sensitive data protection code $PubK_{B1}[SDPC]$, $PubK_{B2}[SDPC]$, and so on, and encrypted sensitive data SymK[SD].

As a result, a data group (public key $PubK_B$, encrypted sensitive data protection code $PubK_B[SDPC]$, and encrypted sensitive data SymK[SD]) for each sensitive data access support terminal B is saved in the sensitive data management apparatus A, as illustrated in FIG. 7. The plurality of sensitive data access support terminals B is used as backup sensitive data access support terminals B in case one is lost, and also, at least one thereof may be entrusted to an administrator by whom the sensitive data management system 1 (FIG. 1) is administrated. In this case, the sensitive data access support terminal B entrusted to the administrator is an "administration terminal" used in emergencies.

In a case where a user loses a sensitive data access support terminal B that the user himself/herself owns and uses on a daily basis, the above-described Process 1 normally cannot be executed, and accordingly the sensitive data SD cannot be restored. However, by preparing a plurality of sensitive data access support terminals B in advance, if another sensitive data access support terminal B that the user himself/herself owns remains, this sensitive data access support terminal B can be used to execute Process 1, and the sensitive data SD can be restored and used.

Further, by entrusting one thereof to the administrator as the administration terminal, the user can execute Process 1 through the administrator even if there is no backup sensitive data access support terminal B at hand. A specific method thereof will be described later.

Note that the sensitive data management apparatus A can use a plurality of sensitive data access support terminals B in the same way in later-described second and third embodiments as well. In this case, a data group (encrypted sensitive data protection code SDPC, encrypted sensitive data SymK [SD], etc.) for each sensitive data access support terminal B is saved in the sensitive data management apparatus A.

Now, at a time of generating the symmetric encryption key SymK at the sensitive data management apparatus A (e.g., step S22 in FIG. 4) in the present embodiment, the sensitive data protection code SDPC is used as an input value of the key derivation function (KeyDefFunc( )), as shown below.

KeyDefFunc(SDPC)→SymK

This input value may be an original sensitive data protection code SDPC concatenated with unique data (e.g., a PIN (Personal Identification Number)) generated and saved separately in the sensitive data management apparatus A, rather than the original sensitive data protection code SDPC itself. In this case, the key derivation function is modified as the follows:

KeyDefFunc(SDPC+PIN)→SymK

In this case, the PIN is not recognized by the sensitive data access support terminal B. Accordingly, even if the sensitive data access support terminal B is entrusted to the administrator as the administration terminal, and the administrator knows the details of the key derivation function, the administrator still cannot generate the symmetric encryption key SymK with the sensitive data protection code SDPC alone. Accordingly, this modification is particularly effective in improving safety of sensitive data including considerations with regard to the administrator, when using the administration terminal in an emergency. This modification is applicable to all embodiments.

Second Embodiment

Next, a second embodiment will be described. Note that parts that are the same as in the embodiment described above are denoted by the same signs, and repetitive description will be omitted.

In the decryption processing according to the first embodiment, a data length of the sensitive data protection code SDPC is short by definition. On the other hand, in a case of using the conventional ECIES224 or RSA2048, a data length of the encrypted sensitive data protection code $PubK_B[SDPC]$ generated using the public key $PubK_B$ is 1008 bits or 2048 bits (corresponding to 168 characters or 344 characters when encoded using the Base64), respectively, which is too long to be manually input at a time of the decryption processing of encrypted sensitive data SD.

Therefore, in the second embodiment, partial data, which is the most part of the encrypted sensitive data protection code $PubK_B[SDPC]$, is transmitted to the sensitive data access support terminal B in advance, at a stage of the encryption processing of the sensitive data SD, so that the input data to the sensitive data access support terminal B at a time of the decryption processing is sufficiently short to be manually input. Accordingly, a length of data to be input to the sensitive data access support terminal B in the decryption processing becomes shorter, and thus the decryption processing can be carried out easily even by a manual operation, rather than an electronic data communication.

Figure 8:
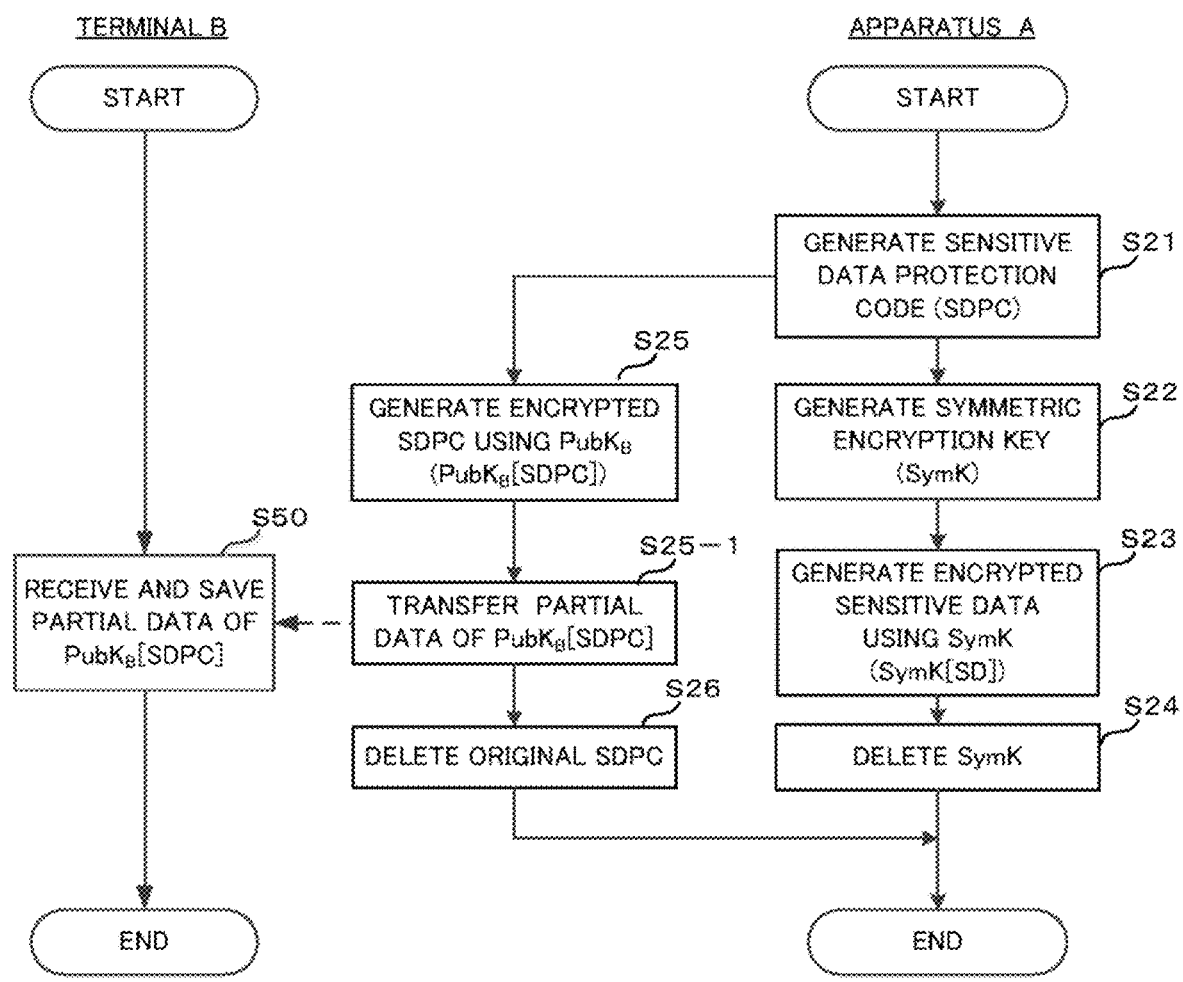
FIG. 8 is a flowchart illustrating an encryption subroutine for sensitive data according to a second embodiment.

FIG. 8 is a flowchart illustrating an encryption subroutine for sensitive data SD according to the second embodiment. That is to say, in the second embodiment, the sensitive data management apparatus A executes the subroutine shown in FIG. 8 instead of the subroutine shown in FIG. 4. The subroutine in FIG. 8 is configured generally the same as the subroutine in FIG. 4, but a step S25-1 is added between step S25 and step S26 in FIG. 4, and further a step S50 is added.

In step S25-1, the sensitive data management apparatus A transmits partial data, which is the most part of the encrypted sensitive data protection code $PubK_B[SDPC]$, to the sensitive data access support terminal B, and thereafter deletes the transmitted partial data from the encrypted sensitive data protection code $PubK_B[SDPC]$. Thus, remaining data after the partial data is deleted from the encrypted sensitive data protection code $PubK_B[SDPC]$ (hereinafter referred to as rest data) is saved in the sensitive data management apparatus A. The rest data is preferred to be no more than 256 bytes, for example. Note that it is most preferable for the rest data to be 16 bytes.

In step S50, the sensitive data access support terminal B receives and saves the partial data of the encrypted sensitive data protection code $PubK_B[SDPC]$ transmitted from the sensitive data management apparatus A.

Figure 9:
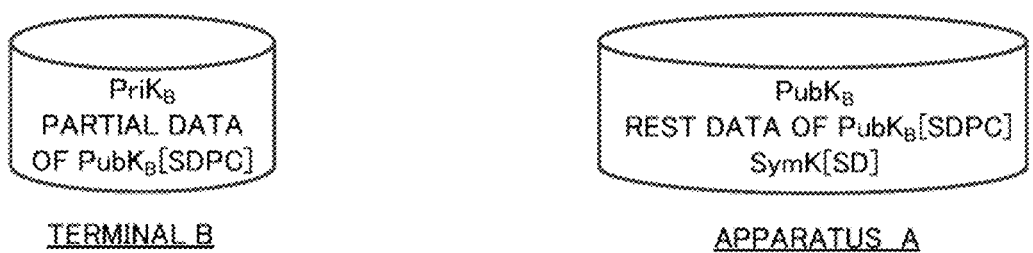
FIG. 9 is a conceptual diagram illustrating data saved in each of a sensitive data access support terminal and a sensitive data management apparatus, after the encryption of sensitive data, according to the second embodiment.

FIG. 9 is a conceptual diagram illustrating data saved in each of the sensitive data access support terminal B and the sensitive data management apparatus A after the encryption of the sensitive data SD shown in FIG. 3 and FIG. 8.

After the encryption of the sensitive data SD, the partial data of the encrypted sensitive data protection code $PubK_B[SDPC]$ is saved in the sensitive data access support terminal B, in addition to the private key $PriK_B$. In contrast, the public key $PubK_B$, the rest data of the encrypted sensitive data protection code $PubK_B[SDPC]$, and the encrypted sensitive data $SymK[SD]$ are saved in the sensitive data management apparatus A.

Figure 10:
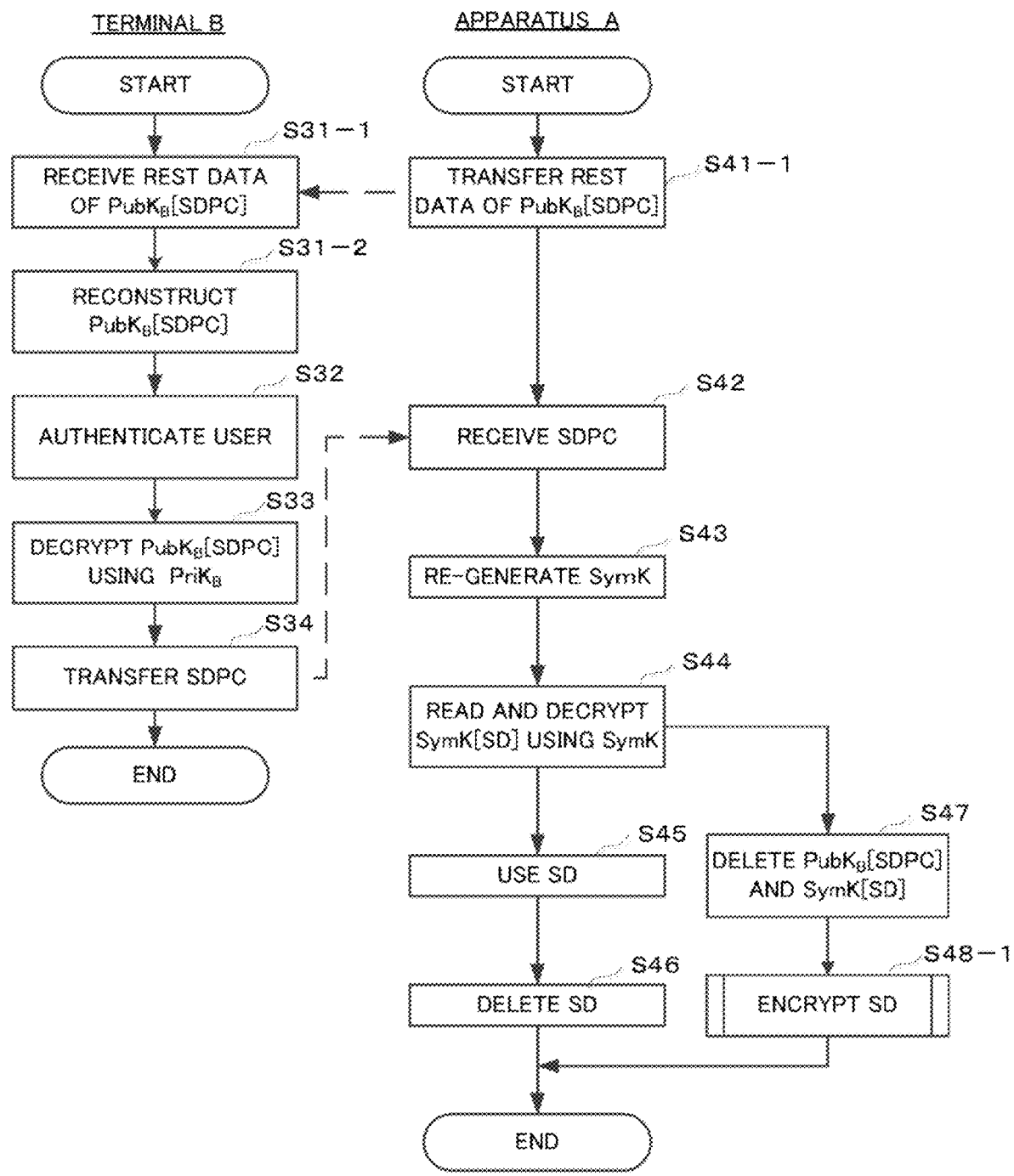
FIG. 10 is a flowchart illustrating a decryption routine for sensitive data according to the second embodiment.

FIG. 10 is a flowchart illustrating a decryption routine for sensitive data SD according to the second embodiment. In the second embodiment, the sensitive data access support terminal B executes steps S31-1 through S34 in FIG. 10 instead of steps S31 through S34 in FIG. 6. Although steps S31-1 through S34 in FIG. 10 are configured generally the same as steps S31 through S34 in FIG. 6, steps S31-1 and S31-2 in FIG. 10 are added instead of step S31 in FIG. 6.

The sensitive data management apparatus A executes steps S41-1 through S48-1 in FIG. 10 instead of the routine in steps S41 through S48 in FIG. 6. Although steps S41-1 through S48-1 in FIG. 10 are configured generally the same as steps S41 through S48 in FIG. 6, steps S41-1 and S48-1 in FIG. 10 are added instead of steps S41 and S48 in FIG. 6, respectively.

In step S31-1, the sensitive data access support terminal B receives the rest data of the encrypted sensitive data protection code $PubK_B[SDPC]$ transmitted from the sensitive data management apparatus A. The rest data is transmitted from the sensitive data management apparatus A in step S41-1, which will be described in detail later.

In step S31-2, the sensitive data access support terminal B concatenates the partial data of the encrypted sensitive data protection code $PubK_B[SDPC]$ saved within the sensitive data access support terminal B, with the rest data transmitted from the sensitive data management apparatus A, thereby reconstructing the encrypted sensitive data protection code $PubK_B[SDPC]$.

Thereafter, the sensitive data access support terminal B performs user authentication (step S32) in the same way as in the first embodiment, and then decrypts the encrypted sensitive data protection code $PubK_B[SDPC]$ using the private key $PriK_B$ (step S33). As a result, the sensitive data protection code SDPC is generated. The sensitive data access support terminal B then transmits the generated sensitive data protection code SDPC to the sensitive data management apparatus A (step S34).

On the other hand, the sensitive data management apparatus A executes the following processing using the rest data of the encrypted sensitive data protection code $PubK_B$ [SDPC] in which the already-transmitted partial data is missing.

In step S41-1, the sensitive data management apparatus A transmits the rest data of the encrypted sensitive data protection code $PubK_B[SDPC]$ to the sensitive data access support terminal B. The sensitive data access support terminal B then executes steps S31-1 through S34 in FIG. 10 described above, and transmits the generated sensitive data protection code SDPC to the sensitive data management apparatus A.

The sensitive data management apparatus A then receives the sensitive data protection code SDPC transmitted from the sensitive data access support terminal B (step S42), and after executing processing the same as in the first embodiment (step S44 through step S47), encrypts the sensitive data SD again (step S48-1).

In step S48-1, the sensitive data management apparatus A executes the subroutine in FIG. 8 described above.

As described above, the sensitive data management apparatus A according to the second embodiment transmits the partial data, which is the most part of the encrypted sensitive data protection code $PubK_B[SDPC]$, to the sensitive data access support terminal B in advance, at a stage of the encryption processing of the sensitive data SD.

The sensitive data management apparatus A then transmits the rest data of the encrypted sensitive data protection code $PubK_B[SDPC]$ to the sensitive data access support terminal B at a stage of the decryption processing of the sensitive data SD. This transmission of data is performed regarding the rest data after the transmission of the partial data, which is the most part of the encrypted sensitive data protection code $PubK_B[SDPC]$, and accordingly can be easily realized even by a manual operation.

In this way, even in an emergency where a user wants to access the sensitive data SD but the network is not available, for example, if the rest data of the encrypted sensitive data protection code $PubK_B[SDPC]$ is displayed on the display unit 106 of the sensitive data management apparatus A, the user can directly input the rest data by a manual operation at the input unit 101 of the sensitive data access support terminal B and obtain the sensitive data protection code SDPC itself, and thus can use the sensitive data SD.

The second embodiment is also applicable in a case where another sensitive data access support terminal B is added as the administration terminal. Data lengths of the rest data of the encrypted sensitive data protection code $PubK_B[SDPC]$ and the sensitive data protection code SDPC are both sufficiently short to be input by a manual operation, as described above. Accordingly, bidirectional data exchange between the administration terminal (sensitive data access support terminal B) and the sensitive data management apparatus A in the decryption processing of the sensitive data SD is carried out as follows, for example.

First, the user orally notifies the administrator of the rest data of the encrypted sensitive data protection code $PubK_B$ [SDPC] displayed on the display unit 106 of the sensitive data management apparatus A. The administrator then inputs the rest data of the encrypted sensitive data protection code $PubK_B[SDPC]$ notified thereto by the user, into the administration terminal by a manual operation, and acquires the sensitive data protection code SDPC.

Next, the administrator orally notifies the user of the acquired sensitive data protection code SDPC. Finally, the user inputs the sensitive data protection code SDPC notified thereto by the administrator, into the sensitive data management apparatus A by a manual operation.

Further, the sensitive data management apparatus A may, in step S25-1 in FIG. 8, transmit not the partial data of the encrypted sensitive data protection code $PubK_B[SDPC]$ but the entirety thereof to the administration terminal. In this case, there is no need for the sensitive data management apparatus A to transmit the rest data of the encrypted sensitive data protection code $PubK_B[SDPC]$ to the administration terminal at a stage of the decryption processing of the sensitive data SD (step S41-1 in FIG. 10 is unnecessary).

On the other hand, the administration terminal can omit steps S31-1 and S31-2 in FIG. 10, and obtain the sensitive data protection code SDPC immediately after the user authentication.

In such a case, even if the user loses the sensitive data access support terminal B that the user himself/herself owns and uses on a daily basis, if the administrator to whom the administration terminal has been entrusted can be contacted by telephone or the like, the user can directly ask the administrator for the sensitive data protection code SDPC, and then access the sensitive data SD by using the sensitive data protection code SDPC. More specifically, this is as follows.

In a case of being contacted by a user who has lost the sensitive data access support terminal B, the administrator first confirms a legitimacy of the user (whether the user is a legitimate owner of the sensitive data access support terminal B or not). The method of confirming the legitimacy is not limited in particular, and may be an oral confirmation of his/her identity, for example. After the confirmation of the legitimacy of the user, the administrator then uses the administration terminal with which he/she has been entrusted, obtains the sensitive data protection code SDPC and finally orally communicates this sensitive data protection code SDPC to the user. As a result, the user can restore and use the sensitive data SD by manually inputting the sensitive data protection code SDPC communicated thereto by the administrator to the sensitive data management apparatus A.

Third Embodiment

A third embodiment will be described next. Note that parts that are the same as in the embodiments described above are denoted by the same signs, and repetitive description will be omitted. The third embodiment uses the Elliptic Curve Diffie-Hellman (ECDH) key exchange protocol. The ECDH key exchange protocol is one of the Diffie-Hellman (DH) key exchange protocol using the elliptic curve cryptography.

For the sake of simplicity, the DH key exchange protocol that does not use the elliptic curve cryptography will be described below.

In the DH key exchange protocol, two parties (e.g., Alice and Bob) who have no prior knowledge of each other can share a symmetric encryption key over a channel that is not secure. This symmetric encryption key is used for encryption of subsequent communications. The following is a specific example of the DH key exchange protocol.

1. Alice chooses two prime numbers g and p, and tells Bob what they are.
2. Bob chooses a secret number a, but does not share it with anyone.
Bob calculates A ($=g^a$ mod p) and transmits the calculated result A to Alice.
3. Alice chooses a secret number b, but does not share it with anyone.
Alice calculates B ($=g^b$ mod p) and transmits the calculated result B to Bob.
4. Bob calculates $B^a$ mod p using the calculated result B.
5. Alice calculates $A^b$ mod p using the calculated result A.

The calculation result of step 4 and the calculation result of step 5 are the same value, and serve as a symmetric encryption key shared between the parties. This is because the following two equations hold.

$$(g^a \bmod p)^b \bmod p = g^{ab} \bmod p$$

$$(g^b \bmod p)^a \bmod p = g^{ba} \bmod p$$

Now, in the present embodiment, the sensitive data access support terminal B and the sensitive data management apparatus A share, in advance, a predetermined elliptic curve (e.g., an equation defining the elliptic curve, and parameters such as a base point G, the order n thereof, and so forth) for the ECDH key exchange protocol. The sensitive data access support terminal B and the sensitive data management apparatus A each generate a private key PriK and a public key PubK corresponding thereto on the basis of the shared elliptic curve.

Figure 11:
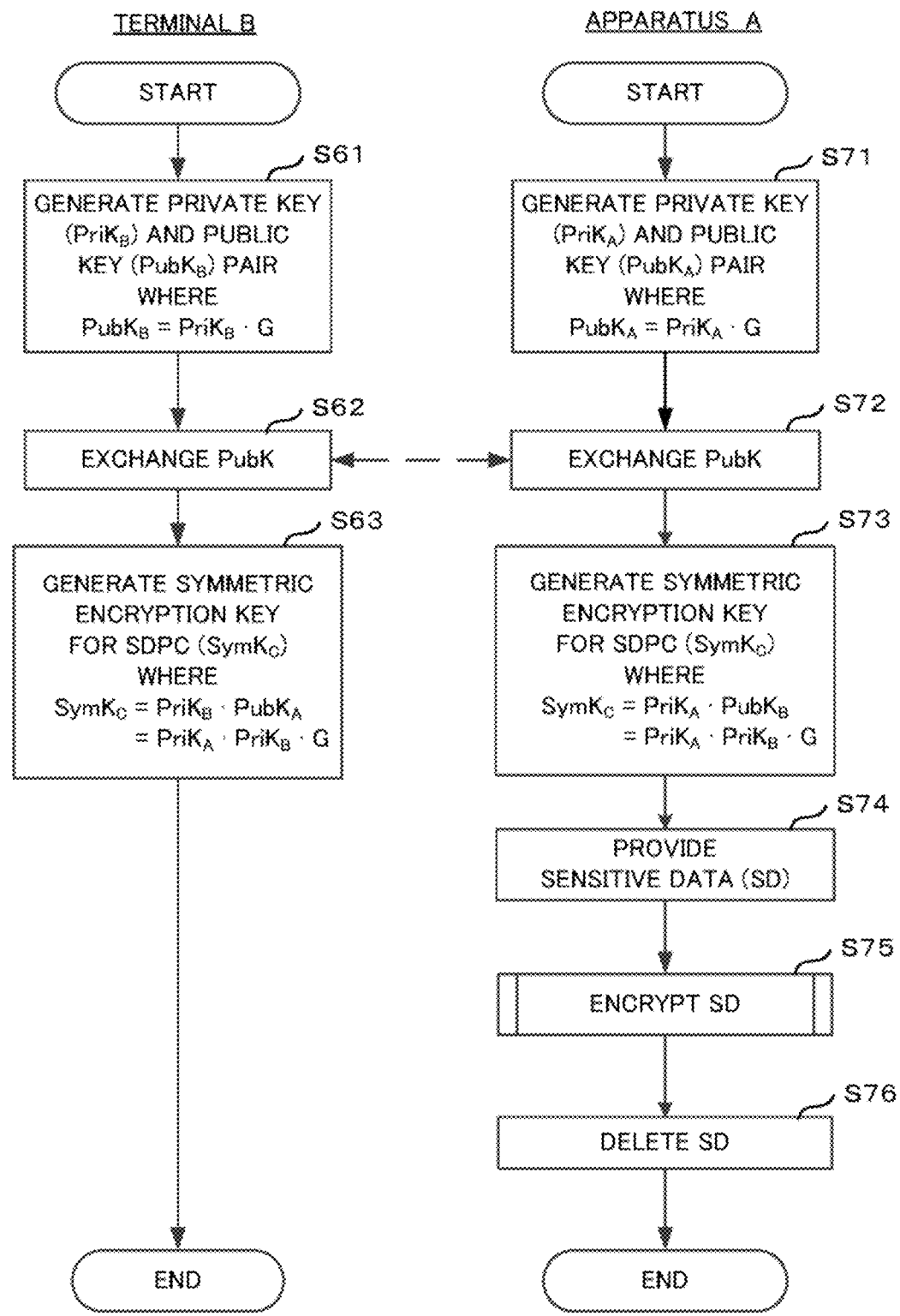
FIG. 11 is a flowchart illustrating an initial encryption routine for sensitive data according to a third embodiment.

FIG. 11 is a flowchart illustrating an initial encryption routine for sensitive data SD according to the third embodiment. According to the third embodiment, the sensitive data access support terminal B executes steps S61 through S63 in FIG. 11 instead of steps S1 and S2 in FIG. 3. Also, the sensitive data management apparatus A executes steps S71 through S76 in FIG. 11 instead of steps S11 through S14 in FIG. 3.

In step S61, the sensitive data access support terminal B generates a private key $PriK_B$ and a corresponding public key $PubK_B$ on the basis of the elliptic curve shared with the sensitive data management apparatus A. Here, the private key $PriK_B$ is an integer randomly selected from among [1, n−1]. The public key $PubK_B$ is generated on the basis of the following equation.

$$PubK_B = PriK_B \cdot G$$

In step S62, the sensitive data access support terminal B exchanges public keys PubK with the sensitive data management apparatus A. Note that step S62 is performed at the same time as step S72, which will be described in detail later. Specifically, the sensitive data access support terminal B transmits the public key $PubK_B$ generated in step S61 to the sensitive data management apparatus A, and receives a public key $PubK_A$ from the sensitive data management apparatus A. The public key $PubK_A$ here is generated in step S71, which will be described in detail later.

That is to say, in the above-described steps S61 and S62, the sensitive data access support terminal B calculates the public key $PubK_B$ from the selected private key $PriK_B$ (equivalent to the secret number a that Alice selected in the above-described example) and the base point G shared with the sensitive data management apparatus A in advance (equivalent to the prime number g that Alice selected in the above-described example), and mutually exchanges (transmits/receives) public keys PubK with the sensitive data management apparatus A.

In step S63, the sensitive data access support terminal B generates a symmetric encryption key $SymK_c$ for encrypting the sensitive data protection code SDPC on the basis of the following equation.

$$SymK_c = PriK_B \cdot PubK_A$$

Note that the symmetric encryption key $SymK_c$ satisfies the following conditions from a relation between the private key $PriK_B$ of the sensitive data access support terminal B and the later-described public key $PubK_A$ of the sensitive data management apparatus A.

$$SymK_c = PriK_B \cdot PubK_A$$
$$= PriK_A \cdot PriK_B \cdot G$$

In step S71, the sensitive data management apparatus A generates a private key $PriK_A$ and a public key $PubK_A$ corresponding thereto on the basis of the elliptic curve shared with the sensitive data access support terminal B. Here, the private key $PriK_A$ is an integer randomly selected from among [1, n−1]. The public key $PubK_A$ is generated on the basis of the following equation.

$$PubK_A = PriK_A \cdot G$$

In step S72, the sensitive data management apparatus A exchanges public keys PubK with the sensitive data access support terminal B. Specifically, the sensitive data management apparatus A transmits the public key $PubK_A$ generated in step S71 to the sensitive data access support terminal B, and receives the public key $PubK_B$ from the sensitive data access support terminal B.

In step S73, the sensitive data management apparatus A generates a symmetric encryption key $SymK_c$ for encrypting the sensitive data protection code SDPC on the basis of the following equation.

$$SymK_c = PriK_A \cdot PubK_B$$

Note that the symmetric encryption key $SymK_c$ satisfies the following conditions from a relation between the private key $PriK_A$ of the sensitive data management apparatus A and the above-described public key $PubK_B$ of the sensitive data access support terminal B.

$$SymK_c = PriK_A \cdot PubK_B$$
$$= PriK_A \cdot PriK_B \cdot G$$

As a result of step S63 and step S73, the sensitive data access support terminal B and the sensitive data management apparatus A each obtain the same symmetric encryption key $SymK_c$.

In step S74, the sensitive data management apparatus A prepares sensitive data SD, such as a password or the like, for example. Note that the sensitive data SD may be transmitted from an external device, or may be saved in the sensitive data management apparatus A in advance.

In step S75, the sensitive data management apparatus A encrypts the sensitive data SD. Note that details of step S75 will be described later.

In step S76, the sensitive data management apparatus A deletes the sensitive data SD. Accordingly, the sensitive data SD itself does not exist in the sensitive data management apparatus A, and only the encrypted sensitive data SD is stored.

Figure 12:
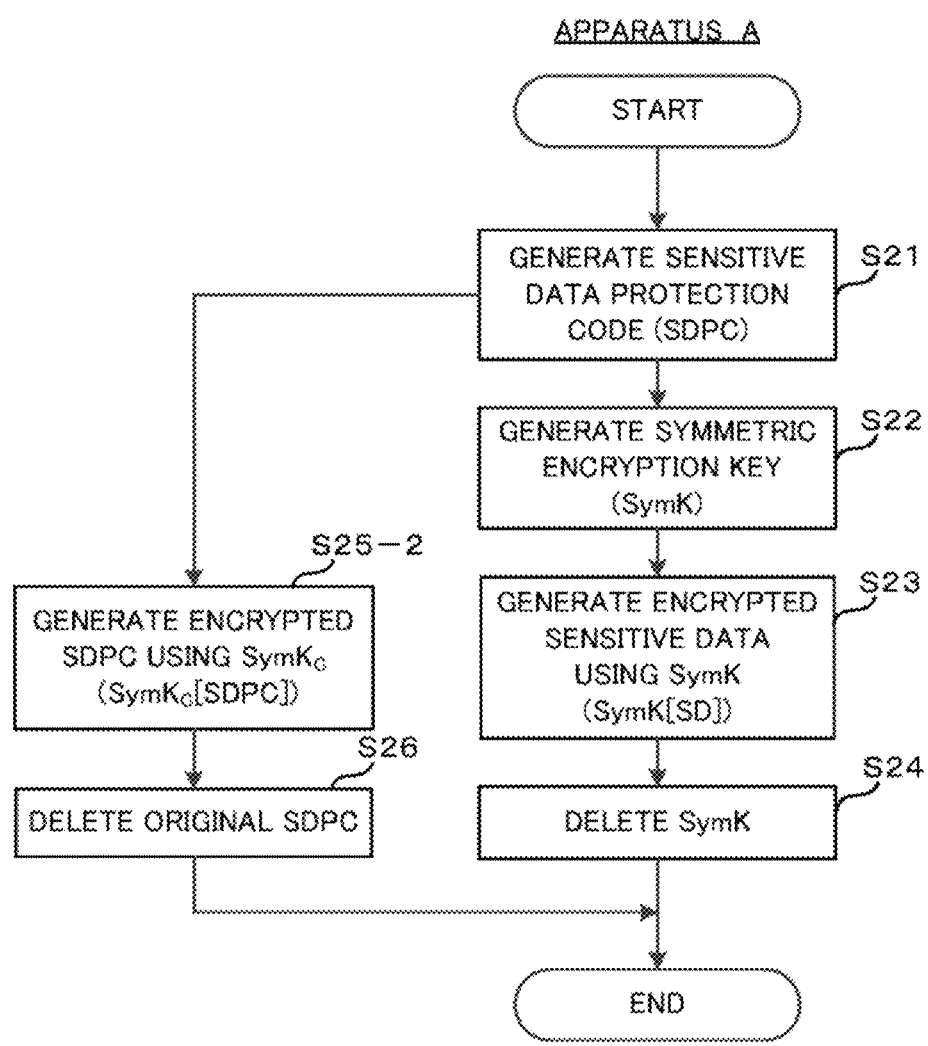
FIG. 12 is a flowchart illustrating an encryption subroutine for sensitive data according to the third embodiment.

FIG. 12 is a flowchart illustrating an encryption subroutine for sensitive data SD according to the third embodiment.

In step S75, the sensitive data management apparatus A executes the subroutine in FIG. 12 instead of the subroutine in FIG. 4. Note that while the subroutine in FIG. 12 is configured generally the same as the subroutine in FIG. 4, a step S25-2 in FIG. 12 is added instead of step S25 in FIG. 4.

In step S25-2, the sensitive data management apparatus A uses the symmetric encryption key $SymK_c$ generated in step S73 in FIG. 11 to encrypt the sensitive data protection code SDPC generated in step S21, thereby generating the encrypted sensitive data protection code $SymK_c[SDPC]$. The sensitive data management apparatus A then deletes the sensitive data protection code SDPC generated in step S21 (step S26).

Figure 13:
FIG. 13 is a conceptual diagram illustrating data saved in each of a sensitive data access support terminal and a sensitive data management apparatus, after the encryption of sensitive data, according to the third embodiment.

FIG. 13 is a conceptual diagram illustrating data saved in each of the sensitive data access support terminal B and the sensitive data management apparatus A after the encryption of the sensitive data SD shown in FIG. 11 and FIG. 12.

After the encryption of the sensitive data SD, the sensitive data access support terminal B has saved therein the public key $PubK_A$ of the sensitive data management apparatus A, the private key $PriK_B$ of itself, and the symmetric encryption key $SymK_c$. Meanwhile the sensitive data management apparatus A has saved therein the public key $PubK_B$ of the sensitive data access support terminal B, the private key $PriK_A$ of itself, the symmetric encryption key $SymK_c$, the encrypted sensitive data protection code $SymK_c[SDPC]$, and the encrypted sensitive data $SymK[SD]$.

Figure 14:
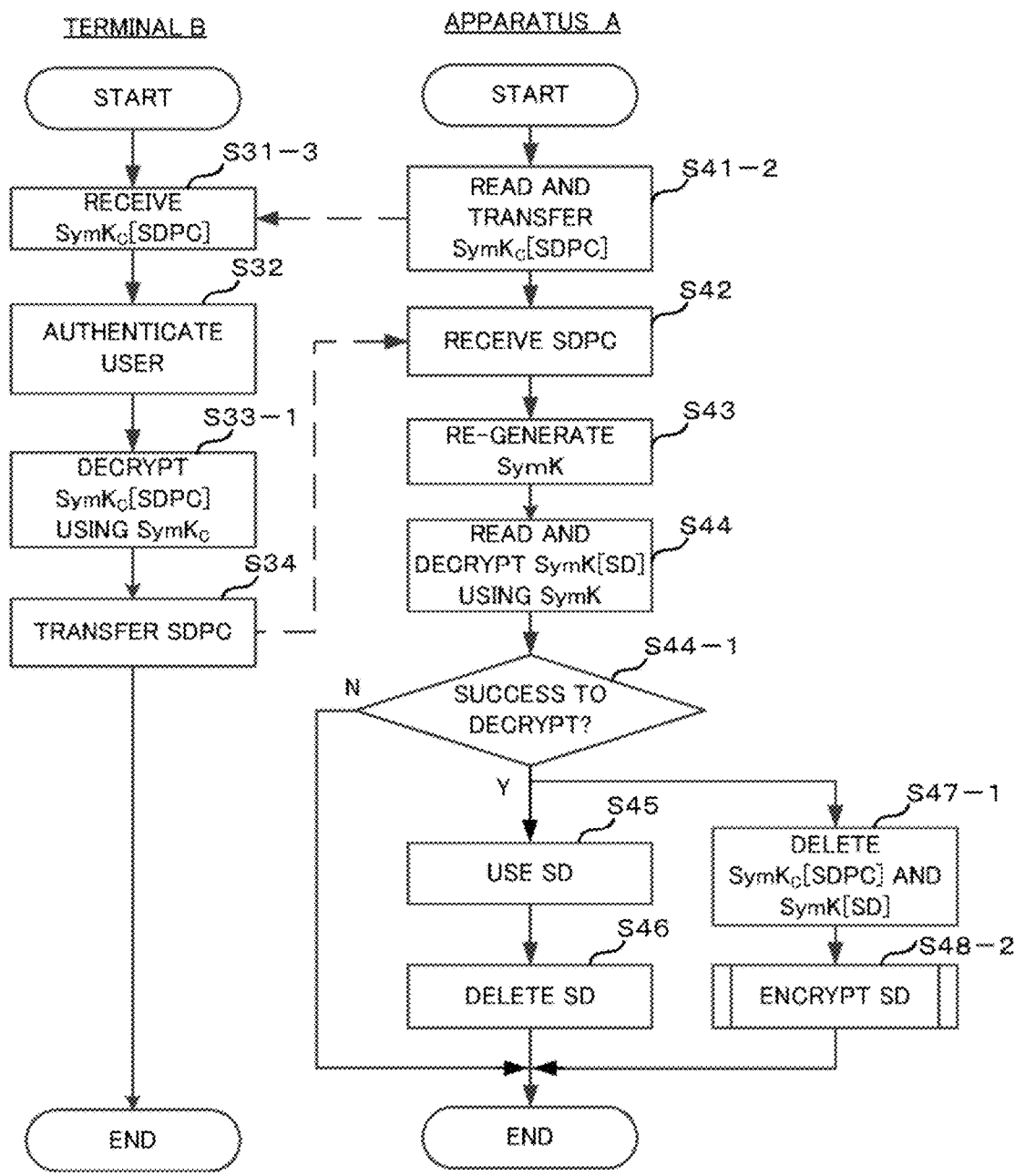
FIG. 14 is a flowchart illustrating a decryption routine for sensitive data according to the third embodiment.

FIG. 14 is a flowchart illustrating a decryption routine for the sensitive data SD according to the third embodiment. While steps S31-3 through S34 in FIG. 14 are configured generally the same as steps S31 through S34 in FIG. 6, steps S31-3 and S33-1 in FIG. 14 are added instead of steps S31 and S33 in in FIG. 6, respectively.

While steps S41-2 through S48-2 in FIG. 14 are configured generally the same as steps S41 through S48 in FIG. 6, steps S41-2, S47-1, and S48-2 in FIG. 14 are respectively added instead of steps S41, S47, and S48 in in FIG. 6, and further, step S44-1 in FIG. 14 is added after step S44 in FIG. 6.

In step S31-3, the sensitive data access support terminal B receives the encrypted sensitive data protection code $SymK_c[SDPC]$ transmitted from the sensitive data management apparatus A. The encrypted sensitive data protection code $SymK_c[SDPC]$ is transmitted from the sensitive data management apparatus A in later-described step S41-2.

In step S32, the sensitive data access support terminal B performs user authentication.

In step S33-1, the sensitive data access support terminal B uses the symmetric encryption key $SymK_c$ generated in step S63 in FIG. 11 to decrypt the encrypted sensitive data protection code $SymK_c[SDPC]$ transmitted from the sensitive data management apparatus A, and obtains the sensitive data protection code SDPC.

In step S34, the sensitive data access support terminal B transmits the sensitive data protection code SDPC obtained in step S33-1 to the sensitive data management apparatus A.

On the other hand, in step S41-2, the sensitive data management apparatus A reads out the encrypted sensitive data protection code $SymK_c[SDPC]$ that is internally saved, and transmits the encrypted sensitive data protection code $SymK_c[SDPC]$ to the sensitive data access support terminal B. Subsequently, the sensitive data access support terminal B executes the processing of steps S31-3 through S34 described above, and transmits the sensitive data protection code SDPC to the sensitive data management apparatus A.

The sensitive data management apparatus A receives the sensitive data protection code SDPC transmitted from the sensitive data access support terminal B (step S42 in FIG. 14), and executes steps S43 and S44 in the same way as in the first embodiment.

In step S44-1, the sensitive data management apparatus A determines whether or not the decryption of the encrypted sensitive data SymK[SD] is successful (whether the sensitive data SD is successfully restored). In a case where the decryption is successful, the sensitive data management apparatus A uses the sensitive data SD, and after confirmation that the processing of the later-described step S47-1 and step S48-2 has been completed, deletes this sensitive data SD (steps S45 and S46). If the decryption is not successful, the routine ends.

In step S47-1, the sensitive data management apparatus A deletes the encrypted sensitive data protection code $SymK_c$[SDPC] and the encrypted sensitive data SymK[SD].

In step S48-2, the sensitive data management apparatus A executes the subroutine in FIG. 12 and encrypts the sensitive data SD again.

Thus, according to the third embodiment, the sensitive data access support terminal B and the sensitive data management apparatus A exchange public keys PubK generated based on the elliptic curve shared with each other in advance, and each generate a symmetric encryption key $SymK_c$ for encryption and decryption of the sensitive data protection code SDPC. This yields the following advantageous effects.

The sensitive data access support terminal B and the sensitive data management apparatus A can use the symmetric encryption key $SymK_c$ generated by each, in order to internally perform encryption and decryption of the sensitive data protection code SDPC within each.

That is to say, in the present embodiment, the symmetric encryption key $SymK_c$ to encrypt and decrypt the sensitive data protection code SDPC is also saved in the sensitive data management apparatus A itself, and accordingly, the encrypted sensitive data protection code $SymK_c$[SDPC] can theoretically be decrypted by the sensitive data management apparatus A alone, even if the sensitive data access support terminal B does not exist.

However, in the present embodiment, processing of the following (a) through (c) is carried out between the sensitive data management apparatus A and the sensitive data access support terminal B, in order to realize so-called "challenge & response" authentication.

(a) The sensitive data management apparatus A transmits the encrypted sensitive data protection code $SymK_c$[SDPC] to the sensitive data access support terminal B.

(b) The sensitive data access support terminal B returns the sensitive data protection code SDPC obtained by decrypting the encrypted sensitive data protection code $SymK_c$[SDPC] within thereof to the sensitive data management apparatus A.

(c) The sensitive data management apparatus A re-generates the symmetric encryption key SymK using the sensitive data protection code SDPC returned from the sensitive data access support terminal B, and thereupon decrypts the encrypted sensitive data SymK[SD] and obtains the sensitive data SD.

As a result, only a user who owns a legitimate sensitive data access support terminal B will succeed in returning the correct sensitive data protection code SDPC to the sensitive data management apparatus A, to cause the sensitive data management apparatus A to decrypt the encrypted sensitive data SymK[SD], and obtain the sensitive data SD. Accordingly, ultimately, the third embodiment yields the same advantageous effects with the sensitive data access support terminal B as the above-described other embodiments.

Now, a data length of the encrypted sensitive data protection code $SymK_c$[SDPC] is sufficiently short to be manually input, as with the data length of the sensitive data protection code SDPC itself, according to the third embodiment. Accordingly, in a case where the sensitive data access support terminal B is the administration terminal, data exchange between the sensitive data management apparatus A and the administration terminal can be manually performed in an emergency in the decryption of the sensitive data SD, in the same way as in the above-described embodiment.

Further, the data transmission from the sensitive data management apparatus A to the sensitive data access support terminal B at a stage of the encryption of the sensitive data SD (FIG. 12) is unnecessary in the present embodiment.

Conversely, in the case of the second embodiment, in order to enable the rest data of the encrypted sensitive data protection code $PubK_B$[SDPC] to be manually input in an emergency at a time of the decryption of the sensitive data SD, the data length of the partial data of the encrypted sensitive data protection code $PubK_B$[SDPC] transmitted at a stage of the encryption of the sensitive data SD (FIG. 8) needs to be sufficiently long. However, in this case, inputting this partial data manually will be severely difficult. The present embodiment is superior to the above-described second embodiment with regard to this point.

REFERENCE SIGNS LIST

A Sensitive data management apparatus
B Sensitive data access support terminal
100 Computer
101 Input unit
102 CPU
106 Display unit
107 Communication unit

The invention claimed is:

1. A sensitive data management apparatus configured for communicating with a sensitive data access support terminal, the sensitive data management apparatus comprising memory storing instructions and one or more processors that, with the instructions, configure the sensitive data management apparatus to:
   generate a sensitive data protection code having a predetermined data length;
   encrypt sensitive data using the sensitive data protection code as a first symmetric encryption key;
   encrypt the sensitive data protection code based on a public key received from the sensitive data access support terminal;
   delete the first symmetric encryption key and the sensitive data after the encryption of the sensitive data;
   delete the sensitive data protection code after the encryption of the sensitive data protection code,
   transmit, to the sensitive data access support terminal, the encrypted sensitive data protection code, when an operation to start decryption of the sensitive data is performed;
   receive, from the sensitive data access support terminal, the a decrypted sensitive data protection code that has been decrypted based on the encrypted sensitive data protection code; and
   decrypt the encrypted sensitive data using a second symmetric encryption key, wherein the decrypted sensitive data protection code received from the sensitive data access support terminal is used as the second symmetric encryption key.

2. The sensitive data management apparatus according to claim 1, further configured to:
  display the encrypted sensitive data protection code, when the operation to start decryption of the sensitive data is performed and the transmission of the encrypted sensitive data protection code fails; and
  input the decrypted sensitive data protection code that has been decrypted based on the encrypted sensitive data protection code displayed,
  wherein, when the decrypted sensitive data protection code is input, the sensitive data protection code input is used as the second symmetric encryption key.

3. The sensitive data management apparatus according to claim 2, further configured to communicate with a plurality of the sensitive data access support terminals.

4. The sensitive data management apparatus according to claim 3, which encrypts the sensitive data protection code using a public key selected among a plurality of public keys received in advance from each of the plurality of the sensitive data access support terminals, further configured to:
  transmit, to a sensitive data access support terminal which has provided a first public key selected among the plurality of the public keys, the sensitive data protection code encrypted using the first public key, when the operation to start decryption of the sensitive data is performed;
  receive, from the sensitive data access support terminal which has provided the first public key, the decrypted sensitive data protection code that has been decrypted based on the sensitive data protection code encrypted using the first public key;
  display the sensitive data protection code encrypted using a second public key different from the first public key, when the operation to start decryption of the sensitive data is performed and the transmission of the sensitive data protection code encrypted using the first public key fails; and
  input the decrypted sensitive data protection code decrypted by the sensitive data access support terminal which has provided the second public key, based on the sensitive data protection code encrypted using the second public key and displayed.

5. The sensitive data management apparatus according to claim 1, further configured to:
  generate a new sensitive data protection code after a user accesses decrypted sensitive data;
  encrypt the decrypted sensitive data using the new sensitive data protection code as a third symmetric encryption key;
  encrypt the new sensitive data protection code using the public key;
  delete the third symmetric encryption key and the sensitive data after the encryption of the decrypted sensitive data; and
  delete the new sensitive data protection code after the encryption of the new sensitive data protection code.

6. The sensitive data management apparatus according to claim 5, further configured to:
  generate the first symmetric encryption key, the second symmetric encryption key, and the third symmetric encryption key based at least in part on a key deviation function applied to the sensitive data protection code as input;
  encrypt the sensitive data using the first symmetric encryption key or the third symmetric encryption key instead of the sensitive data protection code as is; and
  decrypt the sensitive data using the second symmetric encryption key instead of the sensitive data protection code as is.

7. The sensitive data management apparatus according to claim 6, further configured to:
  generate the first symmetric encryption key, the second symmetric encryption key, and the third symmetric encryption key based at least in part on the key derivation function applied to a combination of the sensitive data protection code and unique information that the sensitive data management apparatus itself holds instead of the sensitive data protection code alone.

8. The sensitive data management apparatus according to claim 1, further configured to:
  after the encryption of the sensitive data protection code, transmit, to the sensitive data access support terminal, a second part of the encrypted sensitive data protection code which is a remainder of the encrypted sensitive data protection code after a first part of the encrypted sensitive data protection code is excluded;
  when the operation to start decryption of the sensitive data is performed, transmit, to the sensitive data access support terminal, the first part of the encrypted sensitive data protection code; and
  receive, from the sensitive data access support terminal, the decrypted sensitive data protection code that has been decrypted based on the first part and the second part of the encrypted sensitive data protection code.

9. The sensitive data management apparatus according to claim 8, further configured to:
  display the first part of encrypted sensitive data protection code, when the operation to start decryption of the sensitive data is performed and the transmission of the encrypted sensitive data protection code fails;
  input the decrypted sensitive data protection code that has been decrypted by the sensitive data access support terminal, based on the first part and the second part of the encrypted sensitive data protection code, wherein, when the sensitive data protection code is input, the sensitive data protection code is used as the second symmetric encryption key.

10. The sensitive data management apparatus according to claim 1, further configured to:
  after the encryption of the sensitive data protection code, transmit, to the sensitive data access support terminal, an entirety of the encrypted sensitive data protection code; and
  when the operation to start decryption of the sensitive data is performed, receive, from the sensitive data access support terminal, the decrypted sensitive data protection code that has been decrypted based on the entirety of the encrypted sensitive data protection code.

11. The sensitive data management apparatus according to claim 10, further configured to:
  input the decrypted sensitive data protection code that has been decrypted by the sensitive data access support terminal, based on the entirety of the encrypted sensitive data protection code in advance,
  when the sensitive data protection code is input, use the sensitive data protection code as the second symmetric encryption key.

12. A sensitive data management apparatus configured for communicating with a sensitive data access support terminal, the sensitive data management apparatus comprising memory storing instructions and one or more processors that, with the instructions, configure the sensitive data management apparatus to:
  generate a sensitive data protection code having a predetermined data length;
  encrypt sensitive data using the sensitive data protection code as a first symmetric encryption key;
  generate a second symmetric encryption key by using predetermined information exchanged in advance with the sensitive data access support terminal;
  encrypt the sensitive data protection code using the second symmetric encryption key;
  delete the first symmetric encryption key and the sensitive data after the encryption of the sensitive data;
  delete the sensitive data protection code after the encryption of the sensitive data protection code;
  transmit, to the sensitive data access support terminal, the encrypted sensitive data protection code when an operation to start decryption of the sensitive data is performed;
  receive, from the sensitive data access support terminal, a decrypted sensitive data protection code that has been decrypted based on the encrypted sensitive data protection code; and
  decrypt the encrypted sensitive data using a third symmetric encryption key,
  wherein the sensitive data protection code received from the sensitive data access support terminal is used as the third symmetric encryption key.

13. The sensitive data management apparatus according to claim 12, further configured to:
  display the encrypted sensitive data protection code, when the operation to start decryption of the sensitive data is performed and the transmission of the encrypted sensitive data protection code fails; and
  input the decrypted sensitive data protection code that has been decrypted based on the encrypted sensitive data protection code displayed,
  wherein, when the sensitive data protection code is input, the sensitive data protection code is used as the third symmetric encryption key.

14. The sensitive data management apparatus according to claim 13,
  further configured to communicate with a plurality of the sensitive data access support terminals.

15. The sensitive data management apparatus according to claim 14, which generates the second symmetric encryption key by using predetermined information selected among a plurality of the predetermined information exchanged in advance with each of the plurality of the sensitive data access support terminals and encrypts the sensitive data protection code using the second symmetric encryption key corresponding to each of the plurality of the sensitive data access support terminals, further configured to:
  transmit, to a sensitive data access support terminal with which first predetermined information has been exchanged, among the plurality of the predetermined information exchanged in advance with each of the plurality of the sensitive data access support terminals, the sensitive data protection code encrypted using a fourth symmetric encryption key generated by using the first predetermined information, when the operation to start decryption of the sensitive data is performed;
  receive, from the sensitive data access support terminal with which the first predetermined information has been exchanged in advance, the decrypted sensitive data protection code that has been decrypted based on the sensitive data protection code encrypted using the fourth symmetric encryption key;
  display the sensitive data protection code encrypted using a fifth symmetric encryption key generated by using second predefined information different from the first predetermined information, when the operation to start decryption of the sensitive data is performed and the transmission of the sensitive data protection code encrypted using the fourth symmetric encryption key fails; and
  input the decrypted sensitive data protection code decrypted by the sensitive data access support terminal with which the second predetermined information has been exchanged in advance, based on the sensitive data protection code encrypted using the fifth symmetric encryption key and displayed.

16. The sensitive data management apparatus according to claim 12, further configured to:
  determine success or failure of decryption of the encrypted sensitive data,
  wherein, in a case where a determination is success, the sensitive data management apparatus is further configured to:
  generate a new sensitive data protection code after a user accesses decrypted sensitive data;
  encrypt the decrypted sensitive data using the new sensitive data protection code as a sixth symmetric encryption key;
  encrypt the new sensitive data protection code using the second symmetric encryption key;
  delete the sixth symmetric encryption key and the sensitive data after the encryption of the decrypted sensitive data; and
  delete the new sensitive data protection code after the encryption of the new sensitive data protection code.

17. The sensitive data management apparatus according to claim 16, further configured to:
  generate the first symmetric encryption key, the third symmetric encryption key, and the sixth symmetric encryption key based at least in part on a key deviation function applied to the sensitive data protection code as input;
  encrypt the sensitive data using the first symmetric encryption key or the sixth symmetric encryption key instead of the sensitive data protection code as is; and
  decrypt the sensitive data using the third symmetric encryption key instead of the sensitive data protection code as is.

18. The sensitive data management apparatus according to claim 17, further configured to:
  generate the first symmetric encryption key, the third symmetric encryption key, and the sixth symmetric encryption key based at least in part on the key derivation function applied to a combination of the sensitive data protection code and unique information that the sensitive data management apparatus itself holds instead of the sensitive data protection code alone.

19. A computer program product comprising at least one non-transitory computer-readable storage medium storing computer code that, when executed by a processor, cause the processor to:
  generate a sensitive data protection code having a predetermined data length;
  encrypt sensitive data using the sensitive data protection code as a first symmetric encryption key;

encrypt the sensitive data protection code based on a public key received from the sensitive data access support terminal;

delete the first symmetric encryption key and the sensitive data after the encryption of the sensitive data;

delete the sensitive data protection code after the encryption of the sensitive data protection code, transmit, to the sensitive data access support terminal, the encrypted sensitive data protection code, when an operation to start decryption of the sensitive data is performed;

receive, from the sensitive data access support terminal, a decrypted sensitive data protection code that has been decrypted based on the encrypted sensitive data protection code; and decrypt the encrypted sensitive data using a second symmetric encryption key, wherein the sensitive data protection code received from the sensitive data access support terminal is used as the second symmetric encryption key.

\* \* \* \* \*